United States Patent [19]
Rogers

[11] Patent Number: 6,144,392
[45] Date of Patent: Nov. 7, 2000

[54] METHOD AND APPARATUS FOR FORMATTING A TEXTURE IN A FRAME BUFFER

[75] Inventor: Philip J. Rogers, Pepperell, Mass.

[73] Assignee: ATI Technologies, Inc., Thornhill, Canada

[21] Appl. No.: 09/070,139

[22] Filed: Apr. 30, 1998

[51] Int. Cl.⁷ .................................................. G06F 13/00
[52] U.S. Cl. ........................ 345/511; 345/430; 345/509; 345/525
[58] Field of Search .................................. 345/508, 511, 345/525, 430, 501, 507, 509

[56] References Cited

U.S. PATENT DOCUMENTS

| | | | |
|---|---|---|---|
| 5,767,858 | 6/1998 | Kawase et al. | 345/430 |
| 5,828,382 | 10/1998 | Wilde | 345/501 |
| 5,844,576 | 12/1998 | Wilde et al. | 345/525 |
| 5,905,506 | 5/1999 | Hamburg | 345/438 |
| 5,945,997 | 8/1999 | Zhao et al. | 345/430 |
| 5,956,043 | 9/1999 | Jensen | 345/430 |

*Primary Examiner*—Kee M. Tung
*Attorney, Agent, or Firm*—Markison & Reckamp, P.C.

[57] ABSTRACT

A method for formatting a texture in a frame buffer is accomplished by receiving a lock signal from a processor, where the lock signal is associated with the texture. A pointer to a location in the frame buffer is provided in response to the lock signal, whereupon the processor stores the texture in the frame buffer at the specified location. An unlock signal is then received from the processor, indicating that the texture has been stored. The texture is then copied from the frame buffer to a memory based on a tiling algorithm to produce a tiled version of the texture in the memory. The tiled version is then copied from the memory back to the frame buffer at the specified location.

32 Claims, 6 Drawing Sheets

METHOD AND APPARATUS FOR FORMATTING A TEXTURE IN A FRAME BUFFER

FIELD OF THE INVENTION

The invention relates generally to video graphics processing and more particularly to a method and apparatus for formatting a texture in a frame buffer.

BACKGROUND OF THE INVENTION

Computers are used in many applications. As computing systems continue to evolve, the graphical display requirements of the systems become more demanding. This is especially true in applications where detailed graphical displays must be updated quickly. One example of such an application is a computer game where movement and modification of background images may place great demands on the processing power of the computing system.

In order to display some screen images, detailed textures are stored in memory. These textures are then molded and adapted to overlay or map to structures for display. An example is a brick pattern that would be mapped onto a wall structure, where if the wall is extending into the distance, the texture will be mapped in such a way to show perspective.

When the surface to which particular texture is applied changes frequently, the texture must be retrieved from memory repeatedly to allow the display to be updated. These memory retrievals of the texture can consume a great deal of processing bandwidth, and may result in degradation in the speed of the overall program.

Consequently, a need exists for a system that will allow textures to be retrieved from memory in a faster, more efficient manner that minimizes the use of processing resources.

DETAILED DESCRIPTION OF A PREFERRED EMBODIMENT OF THE INVENTION

Generally, the present invention provides a method and apparatus for formatting a texture in a frame buffer. This is accomplished by receiving a lock signal from a processor, where the lock signal is associated with the texture. A pointer to a location in the frame buffer is provided in response to the lock signal, whereupon the processor stores the texture in the frame buffer at the specified location. An unlock signal is then received from the processor, indicating that the texture has been stored. The texture is then copied from the frame buffer to a memory based on a tiling algorithm to produce a tiled version of the texture in the memory. The tiled version is then copied from the memory back to the frame buffer at the specified location. By tiling the texture and using it in association with a graphics processor that includes a cache, the tiled format of the texture allows for a greater percentage of cache hits when portions of the texture are used repeatedly. This effective cache utilization reduces the amount of processing resources required to utilize the texture in a video graphics system.

Figure 1:
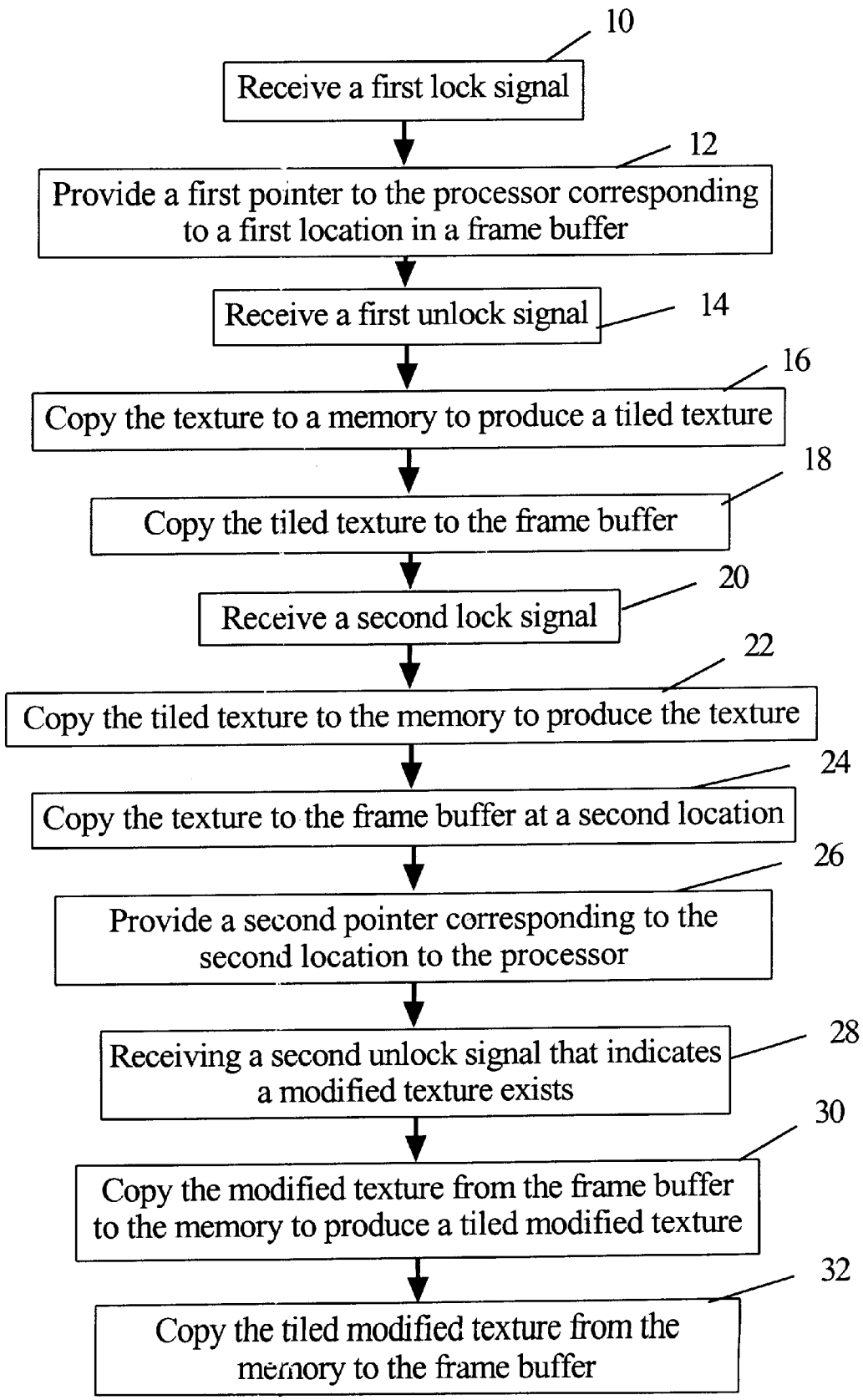
FIG. 1 illustrates a flow chart of a method for formatting a texture in a frame buffer in accordance with the present invention.

FIG. 1 illustrates a flow chart of a method for formatting a texture in a frame buffer. At step 10, a first lock signal is received from the processor. The processor is preferably the central processor of the computer system, and the first lock signal is an indication that a new texture needs to be stored in the frame buffer. A texture is typically rectangular in shape. Individual data points of the texture, known as texels, are arranged in a grid-like pattern. The texture consists of a plurality of rows, where each row includes a plurality of texels.

At step 12, a first pointer corresponding to a first location in the frame buffer is provided to the processor in response to the lock signal. The processor stores the texture in the frame buffer at the first location based on the first pointer. At step 14, a first unlock signal is received from the processor. The unlock signal indicates that the processor has finished storing the texture.

At this point, the texture is stored in a linear format in the frame buffer. When stored in linear format, texels in a row of the texture are stored in successive locations in memory. At the memory location following the location holding a texel that is the end of the row, the first texel in the following row is stored. This storage technique can place texels that are located far apart in terms of display purposes in close proximity in the frame buffer. The graphics processor reads this texture information in order to prepare the image to be displayed. It is often the case that only a portion of the entire texture may be needed, and, when this is the case, it is very rare that specific rows are needed in their entirety. More often, portions of the texture that include parts of multiple rows are required. For example, if the texture is a 256-texel by 256-texel square, the graphics processor may only need the first 40 texels of the first 30 rows.

In order to speed up the retrieval of image data from the frame buffer, the graphics processor may include a cache memory. Data that is retrieved from the frame buffer may be placed in the cache such that when that particular data is needed once again, it can be read from the cache rather than the frame buffer. Typically the access time of the cache memory is much faster than the access time of the frame buffer, and thus, if the cache can be used frequently to retrieve data, the system will run more quickly.

However, cache memory space is often limited such that it is not practical to store large portions of textures in the cache. For example, a 256 by 256 texture where each texel is described by 16 bits of data requires 128K of storage. If the size of the cache is only 4K, "cache thrashing" will result when the system tries to store the large texture in the small cache. "Cache thrashing" is a term that describes the continuous replacement of data in the cache, where the data is not re-used, but is instead replaced by other data before it is needed again. This generally defeats the purpose of the cache and is even counter-productive.

In order to avoid "cache thrashing", textures may be tiled, where a tiled texture is broken up into small rectangles. The data of each small rectangle, or tile, is stored together in memory, rather than having the data stored sequentially based on rows. This type of storage promotes better usage of cache structures as data that is in close proximity with respect to display purposes is also in close proximity within the memory structure of the frame buffer. Thus, when a certain portion of the texture is used repeatedly, it is more likely to remain in the cache if it is in a tiled format. This results in more cache hits, where a hit occurs when the graphics processor needs a piece of data and finds it in the cache rather than having to go to the frame buffer to retrieve it.

At step 16, the texture is copied from the frame buffer to a memory based on a tiling algorithm to produce a tiled version of the texture in the memory. The tiling algorithm rearranges the data such that it is broken up into groups whose members are located close to each other in terms of their display positions. An algorithm for tiling blocks of image data, including textures, is detailed in a co-pending patent application by the same inventor entitled "METHOD AND APPARATUS FOR TILING A BLOCK OF IMAGE DATA" which has a filing date of Apr. 30, 1998 and a Ser. No. of 09/070,247. This co-pending application is herein incorporated by reference. In one embodiment, the rearranging is accomplished when the processor reads the data sequentially from the frame buffer and writes it to the memory based on an interleaving pattern. In another embodiment, the processor may read the data based on the interleaving pattern and then write the data to the memory sequentially. It should be apparent to one skilled in the art that various methods can be used to form the tiled texture in the memory.

At step 18, the tiled version of the texture is copied from the memory to the frame buffer. The memory used to store the tiled version of the texture may be the main memory of the processing system, it may be a separate memory used for temporarily holding tiled textures, or it may be another portion of the frame buffer memory itself. By copying the tiled texture back to the frame buffer, the data is ready for use by the graphics processor. Because it is in tiled format, more cache hits are likely to result if the data is used repeatedly. More cache hits reduce the access time for acquiring the texture data, and thus reduce the processing power and time required to utilize the texture.

Tiling can also improve system performance when image data is filtered. Filtering techniques such as bilinear filtering blend neighboring texels in order to avoid or reduce "blockiness" that may result in the displayed image. Because these filtering schemes blend neighboring texels, tiling helps to fetch multiple texels required for blending. This is because neighboring texels are more likely to be stored proximal to each other in memory when tiling is employed.

If the processor wishes to access the texture in order to modify it or for some other purpose, the processor will assert another lock signal pertaining to that texture. At step 20, a second lock signal is received indicating such a wish. Because the texture is currently stored in the frame buffer in tiled format, it is not suitable for use by the processor. Thus, the texture must be restored to untiled format before the processor is allowed to access it.

At step 22, the tiled texture is copied to the memory based on an untiling algorithm to produce the original untiled texture in memory. The untiling algorithm reverses the interleaving performed by the tiling process. At step 24, the untiled texture is copied back to the frame buffer at a second location. In one embodiment, the second location and the first location are the same location such that the memory allocated for a particular texture is used for both purposes. In another embodiment, the location of the texture in the frame buffer may be changed from the position that the processor stored the original texture.

At step 26, a second pointer is provided to the processor, where the second pointer corresponds to the second location. Based on the second pointer, the processor is able to access the texture in its original untiled format. If the processor modifies the texture, it is desirable to reformat the texture once again. At step 28, the processor signals that it has finished accessing the texture by providing a second unlock signal. The tiling process is then repeated for the modified texture at steps 30 and 32. At step 30, the modified texture is copied from the frame buffer to the memory based on the tiling algorithm as described above to produce a tiled modified texture in the memory. At step 32, the tiled modified texture is copied from the memory back to the frame buffer for use in the system.

When the texture is copied from the frame buffer to the memory in order to produce the tiled texture in the memory, it should be apparent that this is only a temporary copy that is soon copied back to the frame buffer. Because of this temporary status, the selected portion of the memory that is used to store the filed version of the texture may be reused each time that a texture is copied to the memory. Furthermore, this selected portion may be adapted to suit the needs of the system such that when the size of the textures increases or decreases, the size of the selected portion of the memory may be altered in size and location in order to accommodate the needs of the textures. In one embodiment, the size of the selected portion of the memory that is reused is determined based on the maximum size of the textures that it is required to store.

Figure 2:
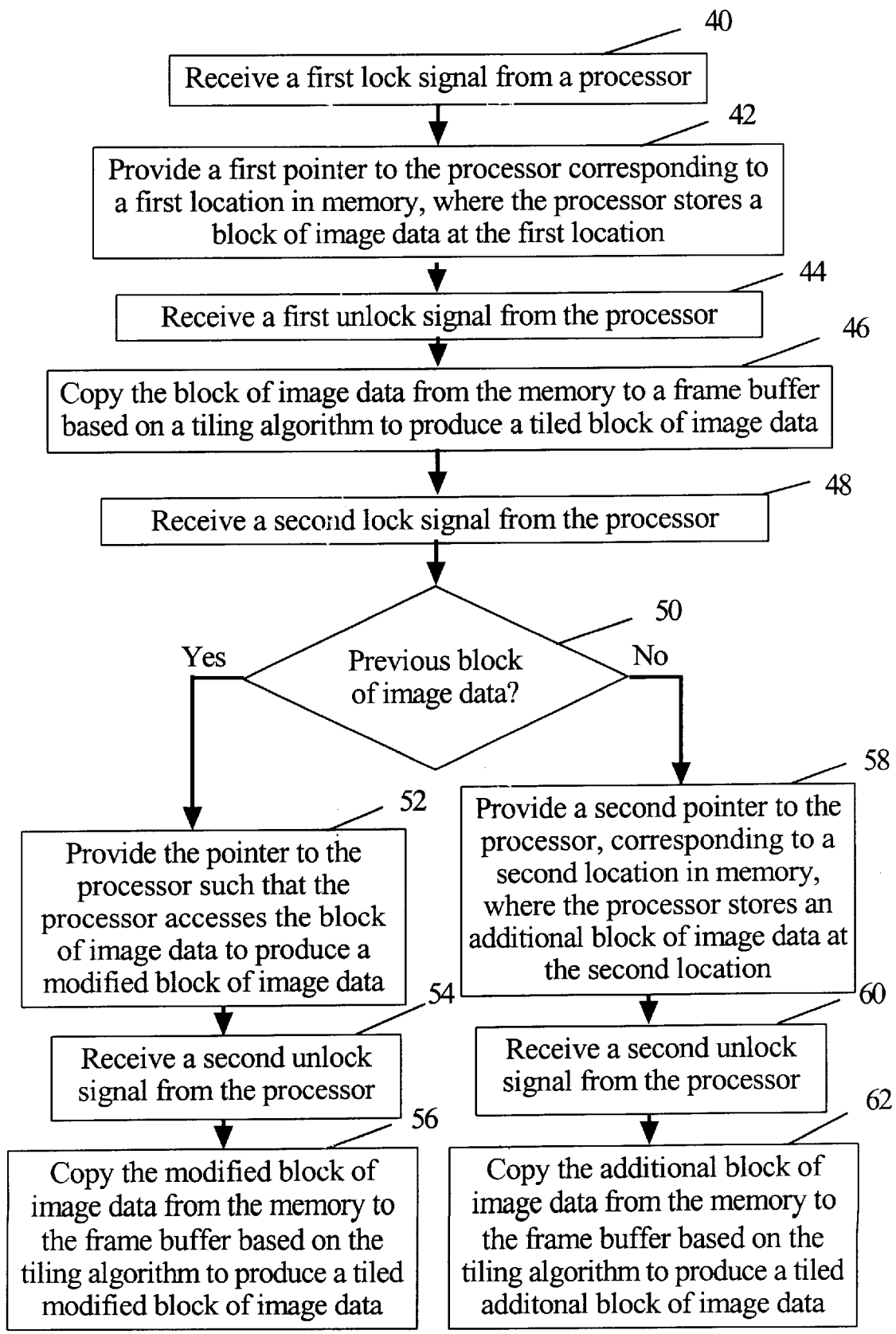
FIG. 2 illustrates a flow chart of a method for formatting a block of image data in accordance with the present invention.

FIG. 2 illustrates a flow chart of an alternate method for formatting a texture in a frame buffer. At step 40, a first lock signal is received from the processor. The first lock signal may indicate that the processor wishes to store a new block of image data, where the block of image data may be a texture. In response to the first lock signal, a pointer is provided at step 42. The pointer corresponds to a first location in memory where the processor stores the block of image data. When using this method, it is preferred that the memory in which the block of image data is stored is a memory other than the frame buffer. This memory may be the main memory of the system or some other memory.

At step 44, a first unlock signal is received from the processor, indicating that the processor has stored the block of image data. At step 46, the block of image data is copied from the memory to the frame buffer based on a tiling algorithm to produce a tiled version of the block of image data in the frame buffer. This tiled version of the block of image data increases the efficiency of a cache used in conjunction with a graphics processor such that access time with regard to the block of image data may be reduced.

At step 48, a second lock signal is received from the processor. At step 50, it is determined whether the second lock signal is related to a previously tiled block of image data or to a new block of image data. If the lock signal pertains to an already tiled block of image data, which indicates that the processor wishes to modify the block of image data, the method proceeds to step 52. At step 52, the processor is provided with the pointer to the original block of image data that is still stored in the memory. Note that this data has not been altered, and therefore does not have to be untiled before being accessed by the processor. The processor can then use this pointer to access and modify the image data to produce a modified block of image data.

At step 54, a second unlock signal is received from the processor, indicating that the processor has completed its modifications to the block of image data. Now that the untiled block of image data in the memory is modified, a tiled version of the modified block of image data needs to be produced in the frame buffer. This is accomplished at step 56, where the modified block of image data is copied from the memory to the frame buffer based on the tiling algorithm to produce the tiled version of the modified block of image data in the frame buffer. This step of copying may be performed such that the resulting block of tiled, modified data overwrites the tiled version of the original block of image data.

If it is determined at step 50 that the second lock signal pertains to an additional block of image data that is different from any currently stored in the memory, the method proceeds to step 58. At step 58 a second pointer is provided to the processor. The second pointer corresponds to a second location in the memory, and the processor stores the additional block of image data at the second location in the memory. At step 60, a second unlock signal is received from the processor, indicating that the processor has stored the additional block of image data in the memory.

At step 62, the additional block of image data is copied from the memory to the frame buffer based on the tiling algorithm to produce a tiled version of the newly added block of image data. This newly tiled block of image data is stored in the frame buffer in a separate, or distinct, location from the tiled versions of other blocks of image data. Thus, there can be many different tiled blocks of image data in the frame buffer, and each of the tiled blocks may have an untiled version that remains in the main memory. Although this method reduces the amount of copying that was required by the method illustrated in FIG. 1, the price that must be paid is in memory usage, as each block of image data requires space in both the frame buffer (tiled version) and the main memory (untiled version).

Figure 3:
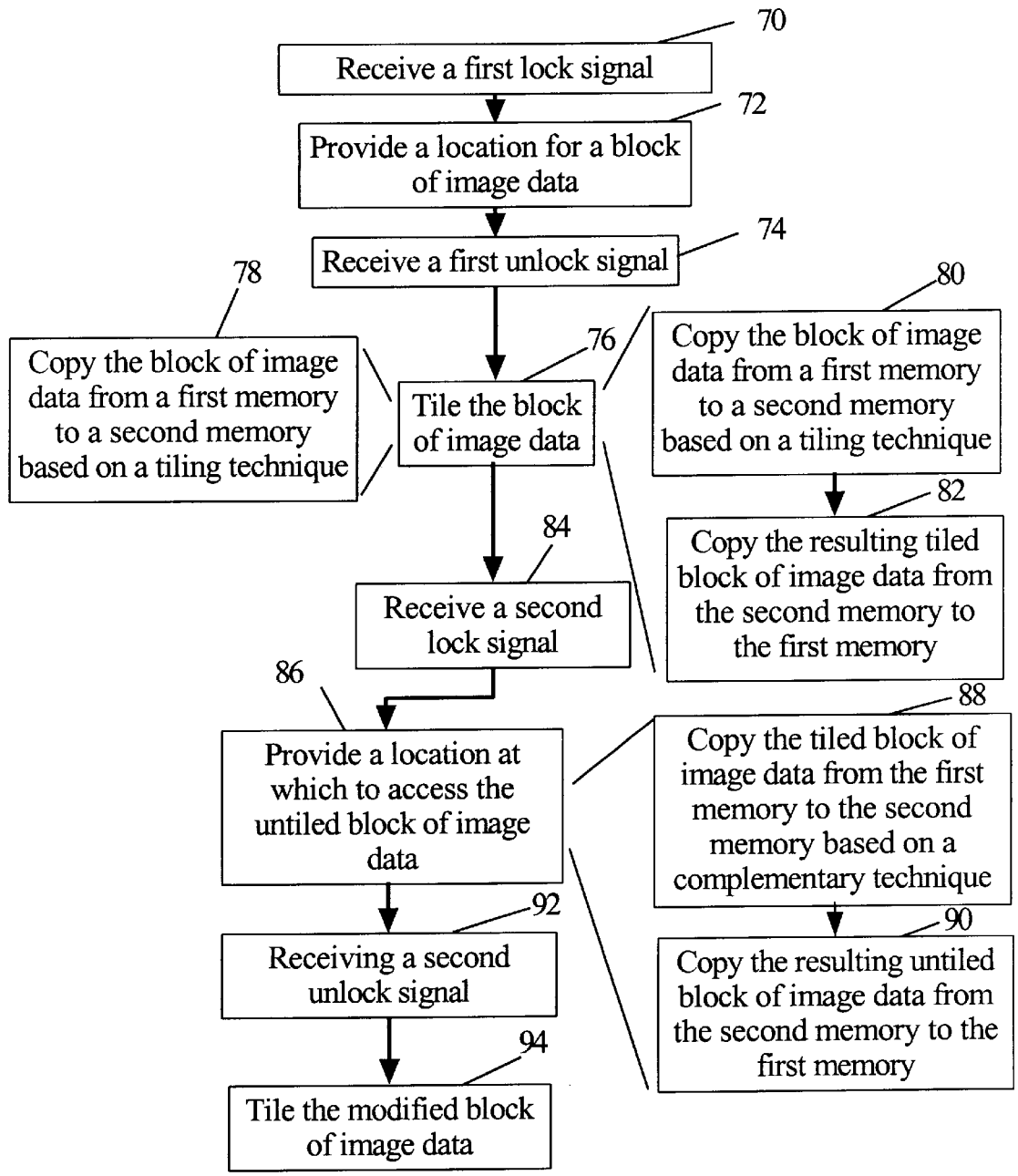
FIG. 3 illustrates a flow chart of a method for tiling a block of image data in accordance with the present invention.

FIG. 3 illustrates a flowchart of a method for tiling a block of image data. At step 70, a first lock signal is received. The lock signal may originate from a central processor in a video graphics system, where the processor requires a pointer in response to the lock signal. At step 72, a location, or pointer to a location, is provided in response to the lock signal, and the location is used to store the block of image data in a first memory. At step 74, a first unlock signal is received, indicating that the block of image data has been stored. The block of image data, which is stored in untiled format in the first memory, is tiled at step 76 in response to the unlock signal.

The tiling of step 76 may be performed as shown in step 78, where the block of image data is copied from the first memory to a second memory based on a tiling technique. The block of untiled data remains in the first memory, and the new tiled version resides in the second memory. A system employing this step may use the main memory of the system as the first memory which stores the untiled versions, and the frame buffer as the second memory. In such a system, the frame buffer would store the tiled versions that help cache performance in filtering and other displaying operations.

Steps 80 and 82 illustrate another tiling technique. At step 80, the block of image data is copied from the first memory to the second memory based on a tiling technique. Then, at step 82, the tiled version of the block of image data is copied from the second memory back to the first memory. A system employing steps 80 and 82 may use the frame buffer as the first memory and the main memory as the second memory. This type of a system may maintain a selected portion of the second memory to use as temporary storage for blocks of image data that are in the process of being tiled. Once a copy of the tiled version of the block of image data has been produced in the frame buffer, the selected portion of the main memory can be used for tiling other blocks of image data.

The tiling method may also include steps that allow access to the original block of image data in untiled format. At step 84, a second lock signal is received that pertains to the block of image data. At step 86, a location is provided that indicates where the untiled version of the block of image data may be accessed. If the system tiled the block of image data by performing step 78, as discussed above, an untiled version of the block of image data may remain in the first memory. In such a case, the system may simply provide a pointer to that location in the first memory.

If, however, the system performed steps 80 and 82 when tiling the block of image data, the untiled version in the first memory may have been overwritten when the tiled version was copied from the second memory to the first memory. In such a case, the untiled block of image data must be regenerated, and steps 88 and 90 illustrate this. At step 88, the tiled block of image data is copied from the first memory to the second memory based on a complementary tiling technique that reverses the tiling performed at step 80. This results in the untiled block of image data being present in the first memory. At this point, the system can provide the location of this block in response to the lock signal. Alternatively, the system can copy the untiled block of data back to the first memory, as shown in step 90, and provide the resulting location in response to the lock signal. By providing the address of the untiled block of image data, the system is indicating that the block of image data has been restored.

At step 92, a second unlock signal is received, indicating that the block of image data has been accessed, and any possible modifications are complete. This modified block of image data is then tiled at step 94 in order to facilitate improved cache usage in the system. The tiling of step 94 may be performed in the same way as the tiling operation of step 76.

Figure 4:
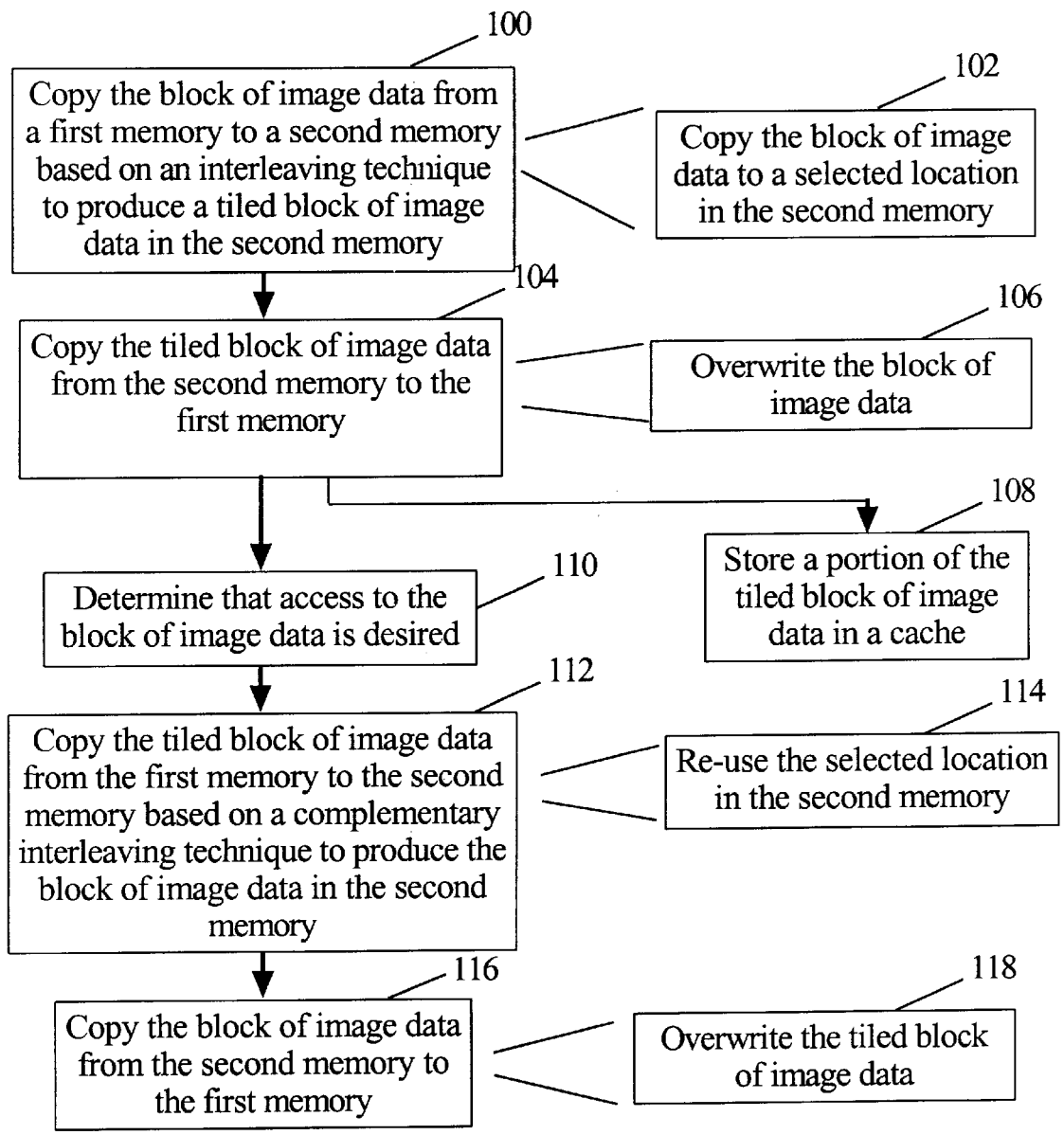
FIG. 4 illustrates a flow chart of a method for formatting a block of image data in accordance with the present invention.

FIG. 4 illustrates an alternate method for formatting a block of image data. At step 100, the block of image data is copied from a first memory to a second memory based on an interleaving technique to produce a tiled block of image data in the second memory. As shown in step 102, the block of image data may be copied into a selected location in the second memory, where the selected location in the second memory is reused each time image data is copied to the second memory. As described earlier with regard to FIG. 1, the selected portion of the second memory may be adapted in terms of size and location to accommodate all possible blocks of image data.

At step 104, the tiled block of image data is copied from the second memory to the first memory. This copying may be performed as in step 106 such that the tiled block of image data overwrites the original block of image data that was stored in the first memory. No data is lost when this occurs, as all of the data of the original block of image data is still present, but simply formatted differently.

If the first memory is used in a system that also includes a cache, a portion of the tiled block of image data may be read and stored in the cache at step 108. Because the data is in tiled format, the benefits of having the cache in the system will be increased. This is because tiling keeps data points of the block of image data that are close to each other when displayed close to each other in terms of their storage in memory.

At step 110, it is determined that access to the block of image data is desired. Because the image data in now stored in tiled format, it must be untiled via steps 112 and 116. Note that step 112, which copies the tiled block of image data to the second memory based on a complementary interleaving technique, may re-use the selected location in the second memory as shown in step 114. Similarly, when the untiled block of image data is copied back to the first memory in step 116, the tiled block of image data may be overwritten as shown in step 118.

Figure 5:
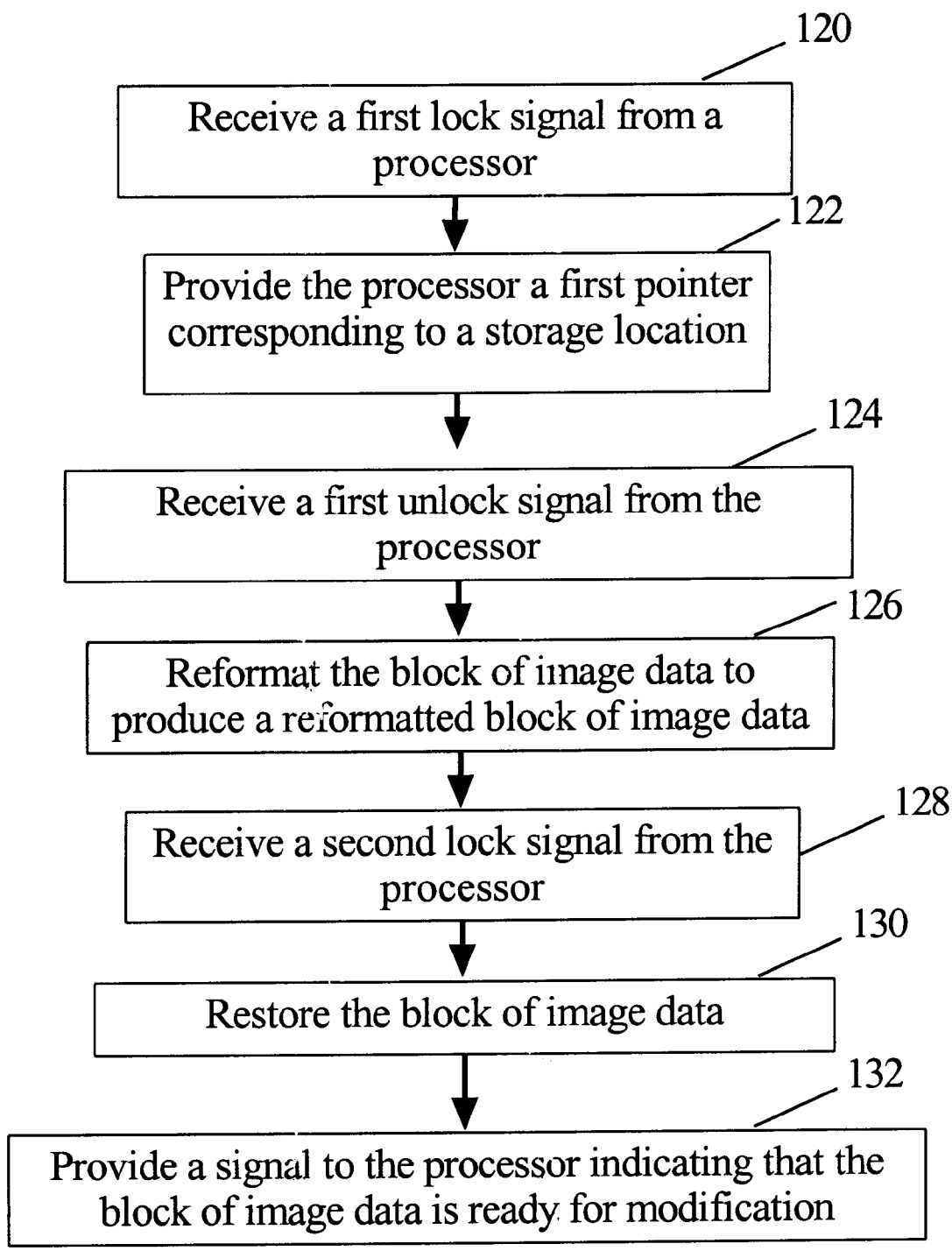
FIG. 5 illustrates a flow chart of a method for maintaining a block of image data for display in accordance with the present invention.

FIG. 5 illustrates a method for maintaining a block of image data for display. This method allows a system to rearrange and reformat a block of image data that has been stored by a processor and then reproduce the original format of the data when necessary. These steps are performed according to the needs of the processor, which are communicated via a lock and an unlock indication. The lock indication communicates that the processor is looking for a pointer at which to store or access a block of data. The unlock indication communicates that the processor has completed storing or modifying the block of data, but has yet to actually make use of it.

At step 120, a first lock signal is received from the processor. At step 122, a pointer is provided to the processor indicating a storage location at which the processor can store the block of image data. At step 124, an unlock signal is received from the processor, indicating that the data storage is complete. At this point, the data can be manipulated and rearranged without fear that the processor will come looking for it with the assumption that it will be in the same format. Based on this, the data is reformatted at step 126 to produce a reformatted block of image data. The block of reformatted image data may be stored at the storage location that the block of image data had been stored in, or it may be stored at an alternate storage location. The reformatted image data may be reformatted in such a way as to make it more suitable for use in some portion of the system. For example, the block of image data may be reformatted such that it is tiled, and therefore better suited for use in a video graphics system that includes a cache.

At step 128, a second lock signal is received from the processor. This lock signal is an indication that the processor wishes to modify, or at least access, the block of image data. The processor expects the image data to be in the same format that it was originally stored in, and therefore, the reformatted data must be massaged back into its original form. At step 130, the block of image data is restored into the original format, and at step 132 a signal is provided to the processor indicating that the block of image data is ready to be modified.

Figure 6:
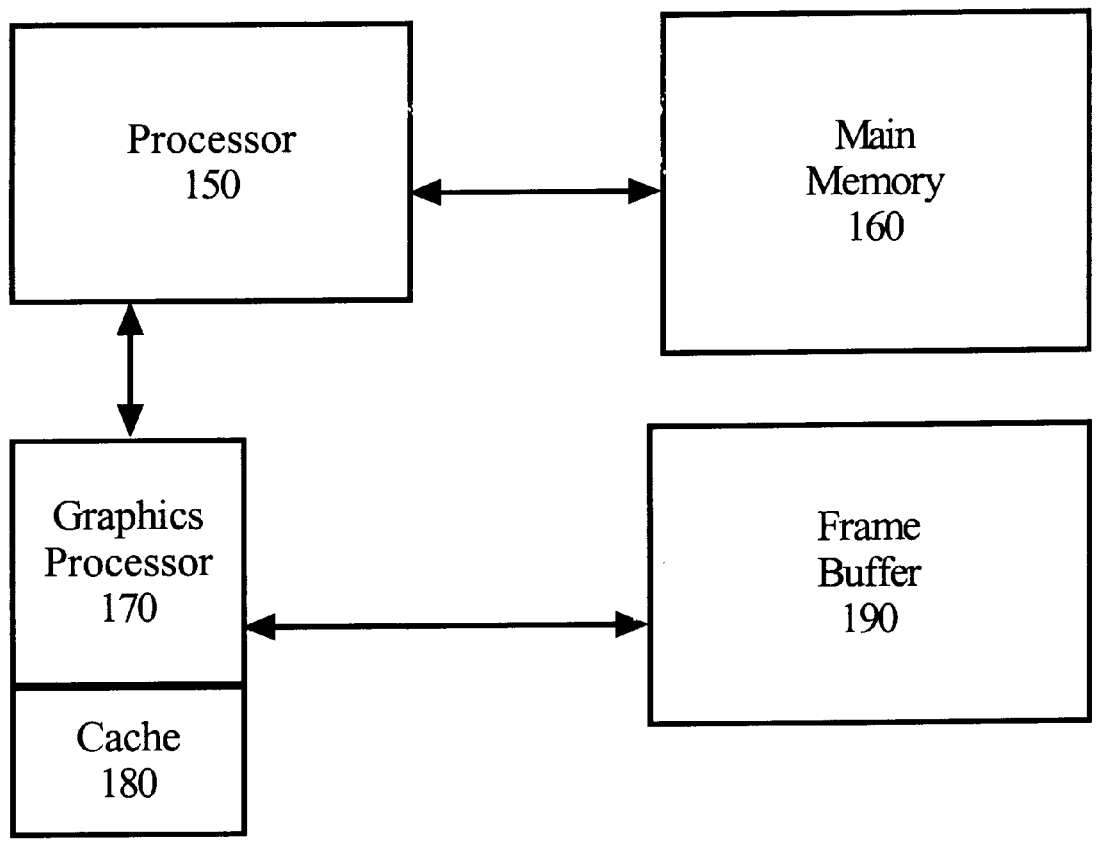
FIG. 6 illustrates a block diagram of a video graphics processing system in accordance with the present invention.

FIG. 6 illustrates a video graphics processing system 155 that increases cache efficiency and operates more quickly and using few processing resources than prior art systems. The processing system 155 may implement any of the methods described in relation to FIGS. 1–5. The methods may be implemented in software that is executed by various parts of the system, or, alternatively, the entire methods or portions thereof may be implemented by specialized circuitry.

The video graphics processing system 155 includes a frame buffer 190, a graphics processor 170, and a cache 180, where the cache 180 may be a part of the graphics processor. The frame buffer 190, the graphics processor 170, and the cache 180 may be implemented on a single graphics processing chip, or they may be part of a system implemented on a circuit board. The video graphics processing system 155 may further include processor 150 and main memory 160. The processor 150 may be coupled to the graphics processor 170 via a bus structure such as an Accelerated Graphics Protocol (AGP) bus or another standardized bus structure used in personal computers. The AGP bus may also allow textures and other image data to be stored in the main memory 160 rather than the frame buffer 190. The graphics processor 170 can read the image data from the main memory 160 over the AGP bus, which is a high-speed bus, and use the image data for generating the image to be displayed.

The frame buffer 190 is used to store data, at least a portion of which includes image data stored in a tiled format. The cache 180, which is operably coupled to the frame buffer 190, is used to store portions of the image data for use by the graphics processor 170. The graphics processor 170 reads image data from the frame buffer and the cache and constructs a derived image for display based on the image data. The graphics processor may perform functions, such as filtering of a texture or another graphical image, requiring multiple data points of the image (texels, pixels, etc . . . ) that are located near each other. If these data points can be stored in the cache such that faster access time is possible for future data accesses, the speed of the system is increased. For this reason, tiling the image data is beneficial as it presents the data in a format that groups neighboring data points together within the memory.

The processor 150 and the main memory 160 are active in changing data stored in an untiled format such that it is reformatted in a tiled format and stored in the frame buffer. In one embodiment, the main memory 160 stores an untiled set of image data and a first set of instructions that code a tiling method or algorithm. The processor 150 reads the first set of instructions and executes them, which causes the processor to perform the tiling. The tiling, which occurs based on the instructions, is accomplished when the processor reads successive portions of the untiled set of image data from the main memory 160 and writes the portions in interleaved locations of the frame buffer 190 to produce a tiled version of the set of image data. The interleaved locations are determined based on the tiling algorithm. In order to facilitate the tiling, the processor may supply a lock signal and an unlock signal to the graphics processor. In response to these signals, the graphics processor provides a location to the processor. The location corresponds to the location of the untiled set of image data in the main memory, and the processor is then able to access the image data based on the location provided.

In another embodiment, the main memory 160 includes a selected storage location and also stores a first set of instructions that code a tiling method or algorithm. As in the embodiment described immediately above, the processor 150 reads the first set of instructions and executes them. Execution of the instructions causes the processor to perform the tiling. In this embodiment, the untiled set of image data is stored in the frame buffer 190, and the processor reads successive portions of the untiled set of image data from frame buffer 190 and writes the portions in interleaved locations of the main memory 160 to produce a tiled version of the set of image data. The processor 150 then copies the tiled set of image data from the main memory 160 to the frame buffer 190. It is preferable that the processor do the step of interleaving when copying the data from the frame buffer to the main memory, as the overhead associated with computing the interleaved addresses can be hidden in the time that it takes to perform the read cycle from the frame buffer. In other words, the read cycle and the calculation of the interleaved address can be performed simultaneously.

The main memory 160 may also include a second set of instructions that when executed by the processor 150 cause the processor to return the tiled set of image data to its original untiled format. This is accomplished by reading successive portions of the tiled set of image data from the frame buffer 190 and writing them in de-interleaved locations in the main memory 160. The de-interleaved locations are based on an untiling algorithm that may also be stored in the main memory 160. This process results in the untiled set of image data being present in the main memory 160. The untiled set of image data can then be copied by the processor 150 back to the frame buffer 190. As described earlier, in order to facilitate the tiling and untiling, the processor 150 may supply a lock signal and an unlock signal to the graphics processor 170. In response to these signals, the graphics processor 170 provides a location to the processor 150. The location corresponds to the location of the image data in the frame buffer 190, and the processor 150 is then able to store or access image data based on the location provided.

It should be understood that the implementation of other variations and modifications of the invention in its various aspects will be apparent to those of ordinary skill in the art, and that the invention is not limited by the specific embodiments described. For example, the interleaving and de-interleaving of image data may be performed when the data is copied from the main memory back to the frame buffer as opposed to when it is copied from the frame buffer to the main memory. It is therefore contemplated to cover by the present invention, any and all modifications, variations, or equivalents that fall within the spirit and scope of the basic underlying principles disclosed and claimed herein.

What is claimed is:

1. A method for formatting a texture in a frame buffer, the method comprising:
    a) receiving a first lock signal from a processor, wherein the lock signal pertains to the texture;
    b) providing a first pointer to the processor in response to the first lock signal, wherein the first pointer corresponds to a first location in the frame buffer, and wherein the processor stores the texture in the frame buffer at the first location based on the first pointer;
    c) receiving a first unlock signal from the processor, wherein the first unlock signal indicates that the processor is finished storing the texture;
    d) copying the texture from the frame buffer to a memory based on a tiling algorithm to produce a tiled texture in the memory; and
    e) copying the tiled texture from the memory to the frame buffer.

2. The method of claim 1 further comprising:
    f) receiving a second lock signal from the processor, wherein the second lock signal indicates that the processor wishes to access the texture;
    g) copying the tiled texture from the frame buffer to the memory based on an untiling algorithm to produce the texture in memory;
    h) copying the texture from the memory to a second location of the frame buffer; and
    i) providing a second pointer to the processor corresponding to the second location, wherein the processor modifies the texture to produce a modified texture.

3. The method of claim 2 further comprising:
    j) receiving a second unlock signal from the processor, wherein the second unlock signal indicates that the processor is finished modifying the texture;
    k) copying the modified texture from the frame buffer to the memory based on the tiling algorithm to produce a tiled modified texture in the memory; and
    l) copying the tiled modified texture from the memory to the frame buffer.

4. The method of claim 2, wherein providing the second pointer further comprises providing a second pointer that is equivalent to the first pointer and wherein the first location and the second location are equivalent.

5. The method of claim 2, wherein copying to the memory further comprises copying to a selected portion of the memory that is used repeatedly.

6. The method of claim 5 further comprises sizing the selected portion based on a maximum size of the texture.

7. A method for formatting a block of image data, the method comprising:
    receiving a first lock signal from a processor;
    providing a first pointer to the processor in response to the first lock signal, wherein the first pointer corresponds to a first location in memory, and wherein the processor stores the block of image data at the first location;
    receiving a first unlock signal from the processor, wherein the unlock signal indicates that the processor has stored the block of image data; and
    copying the block of image data from the memory to a frame buffer based on a tiling algorithm to produce a tiled block of image data in the frame buffer.

8. The method of claim 7 further comprises:
    receiving a second lock signal from the processor, wherein the second lock signal indicates that the processor wishes to modify the block of image data;
    providing the pointer to the processor in response to the second lock signal, wherein the processor modifies the block of image data based on the pointer to produce a modified block of image data in the memory;
    receiving a second unlock signal from the processor, wherein the second unlock signal indicates that the processor has completed modifying the block of image data; and
    copying the modified block of image data from the memory to a frame buffer based on the tiling algorithm to produce a tiled modified block of image data in the frame buffer.

9. The method of claim 8, wherein copying the modified block of image data further comprises copying such that the tiled modified block of image data overwrites the tiled block of image data in the frame buffer.

10. The method of claim 7 further comprises:
    receiving a second lock signal from the processor, wherein the second lock signal corresponds to an additional block of image data;
    providing a second pointer to the processor in response to the second lock signal, wherein the second pointer corresponds to a second location in memory, and wherein the processor stores the additional block of image data at the second location;
    receiving a second unlock signal from the processor, wherein the second unlock signal indicates that the processor has stored the additional block of image data; and copying the additional block of image data from the memory to the frame buffer based on the tiling algorithm to produce a tiled additional block of image data in the frame buffer, where the tiled block of image data and the tiled additional block of image data are distinct within the frame buffer.

11. A method for tiling a block of image data, the method comprising:

receiving a first lock signal;

providing a location in response to the first lock signal, wherein the location is used to store the block of image data in a first memory;

receiving a first unlock signal, wherein the unlock signal indicates that the block of image data is stored in the first memory; and tiling the block of image data in response to the unlock signal.

12. The method of claim 11, wherein tiling further comprises:

is copying the block of image data from the first memory to a second memory based on a tiling technique, wherein the block of image data is stored in an untiled format in the first memory, and wherein copying produces a tiled block of image data in the second memory.

13. The method of claim 12 further comprises copying the tiled block of image data from the second memory to the first memory.

14. The method of claim 13 further comprises:

after copying the tiled block of image data to the first memory, receiving a second lock signal pertaining to the block of image data;

untiling the tiled block of image data; and indicating that the block of image data is restored.

15. The method of claim 14, wherein untiling the tiled block of image data further comprises:

copying the tiled block of image data from the first memory to the second memory based on a complementary technique, wherein the complementary technique produces the block of image data in the untiled format in the second memory; and copying the block of image data in the untiled format from the second memory to the first memory.

16. The method of claim 14 further comprises:

receiving a second unlock signal indicating that the block of image data has been modified to produce a modified block of image data; and tiling the block of modified image data.

17. The method of claim 12 further comprises:

receiving a second lock signal pertaining to the block of image data;

providing the location in response to the second lock signal such that the block of image data can be modified;

receiving a second unlock signal indicating that the block of image data has been modified to produce a modified block of image data; and tiling the modified image data.

18. A method of formatting an untiled block of image data, the method comprising:

copying successive portions of the untiled block of image data from a first memory to a second memory based on an interleaving technique to produce a tiled block of image data in the second memory, wherein copying reads the successive portions of the untiled block of image data and writes the successive portions at interleaved locations in the second memory, wherein the interleaved locations are based on a tiling alogorithm; and copying the tiled block of image data from the second memory to the first memory.

19. The method of claim 18, wherein copying the tiled block of image data from the second memory to the memory overwrites the untiled block of image data in the first memory.

20. The method of claim 19, wherein when access to the untiled block of image data is desired, the method further comprises:

copying successive portions of the tiled block of image data from the first memory to the second memory based on a complementary interleaving technique, wherein the complementary interleaving technique produces the untiled block of image data in the second memory, wherein copying based on the complementary interleaving technique reads the successive portions of the tiled block of image data from the first memory and writes the successive portions in de-interleaved locations within the second memory, wherein the de-interleaved locations are based on an untiling algorithm; and copying the untiled block of image data from the second memory to the first memory.

21. The method of claim 20, wherein copying the untiled block of image data from the second memory to the memory overwrites the tiled block of image data in the first memory.

22. The method of claim 20, wherein copying image data to the second memory includes writing the data to a selected portion of the second memory, wherein at least a portion of the second memory is reused each time image data is copied to the second memory.

23. The method of claim 18 further comprises storing a portion of the tiled block of image data in a cache operably coupled to at least one of the first memory and the second memory.

24. A method for maintaining a block of image data for display, the method comprising:

receiving a first lock signal from a processor;

providing the processor with a pointer to a storage location in response the lock signal;

receiving a first unlock signal from the processor, wherein the first unlock signal indicates that the processor has stored the block of image data at the storage location;

reformatting the block of image data to produce a reformatted block of image data;

receiving a second lock signal from the processor, wherein the second lock signal indicates that the processor wishes to modify the block of image data;

restoring the block of image data based on the reformatted block of image data; and providing a signal to the processor indicating that the block of image data is ready for modification.

25. The method of claim 24, wherein reformatting the block of image data further comprises storing the reformatted block of image data at the storage location.

26. The method of claim 24, wherein reformatting the block of image data further comprises storing the reformatted block of image data at an alternate storage location.

27. The method of claim 24 further comprises copying at least a portion of the reformatted block of image data to a cache.

28. A video graphics processing system, comprising:
- a frame buffer storing at least image data, wherein at least a portion of the image data is in a tiled format;
- a cache operably coupled to the frame buffer, wherein the cache stores portions of the image data;
- a graphics processor operably coupled to the frame buffer and the cache, wherein the graphics processor reads image data from the frame buffer and the cache and constructs a derived image for display based on the image data;
- a processor operably coupled to the frame buffer and the graphics processor; and
- a main memory operably coupled to the processor, the graphics processor, and the frame buffer, wherein the main memory stores an untiled set of image data and a first set of instructions, wherein when executed the first set of instructions cause the processor to:
  - read successive portions of the untiled set of image data; and
  - write the successive portions of the untiled set of image data in interleaved locations of the frame buffer to produce a tiled set of image data, wherein the interleaved locations are determined based on a tiling algorithm.

29. The apparatus of claim 28, wherein the processor provides a lock signal and an unlock signal to the graphics processor, and wherein the graphics processor provides a location to the processor in response to the lock and unlock signals, wherein the processor accesses the untiled set of image data based on the location.

30. A video graphics processing system, comprising:
- a frame buffer storing at least image data, wherein at least a portion of the image data is in a tiled format;
- a cache operably coupled to the frame buffer, wherein the cache stores portions of the image data;
- a graphics processor operably coupled to the frame buffer and the cache, wherein the graphics processor reads image data from the frame buffer and the cache and constructs a derived image for display based on the image data;
- a processor operably coupled to the frame buffer and the graphics processor; and
- a main memory operably coupled to the processor, the graphics processor, and the frame buffer, wherein the main memory includes a selected storage location and a first set of instructions, wherein when executed the first set of instructions cause the processor to:
  - read successive portions of an untiled set of image data stored in the frame buffer;
  - write the successive portions of the untiled set of image data in interleaved locations of the selected storage location of the main memory to produce a tiled set of image data, wherein the interleaved locations are determined based on a tiling algorithm; and
  - copy the tiled set of image data from the main memory to the frame buffer.

31. The apparatus of claim 31, wherein the main memory includes a second set of instructions wherein when executed the second set of instructions cause the processor to:
- read successive portions of the tiled set of image data stored in the frame buffer;
- write the successive portions of the tiled set of image data in de-interleaved locations of the selected storage location of the first memory to reproduce the untiled set of image data, wherein the de-interleaved locations are determined based on a untiling algorithm; and
- copy the untiled set of image data from the main memory to the frame buffer.

32. The apparatus of claim 31, wherein the processor provides a lock signal and an unlock signal to the graphics processor, and wherein the graphics processor provides a location to the processor in response to the lock and unlock signals, wherein the processor accesses the untiled set of image data based on the location.

* * * * *